Inventor
Joseph T. Thayer Jr.
by his Attorneys
Howson & Howson

Patented Feb. 14, 1950

2,497,192

UNITED STATES PATENT OFFICE 2,497,192

LAWN RAKE

Joseph T. Thayer, Jr., Hatboro, Pa., assignor to Henry Disston and Sons, Inc., Philadelphia, Pa., a corporation of Pennsylvania Application March 24, 1948, Serial No. 16,679

3 Claims. (Cl. 56—400.17)

This invention relates to lawn rakes and more particularly to that type of rake wherein the tines are assembled and relatively arranged in a manner such that the working ends of the tines describe a curve which, when the rake is presented to a flat work surface at a normal working angle, will assume a relation of tangency with said surface.

A principal object of the invention is to provide a construction which will compensate for the aforesaid curvature so that the working tips of the tines will, when the rake assumes the aforesaid normal working angle with respect to the work surface, describe a straight line within the plane of said surface. Under these circumstances all of the working tips of the tines will, in the normal working positions of the rake, actually engage or lie in close propinquity to the work surface and the rake will therefore function at maximum efficiency.

The invention will be more readily understood by reference to the attached drawings wherein.

Figure 1:
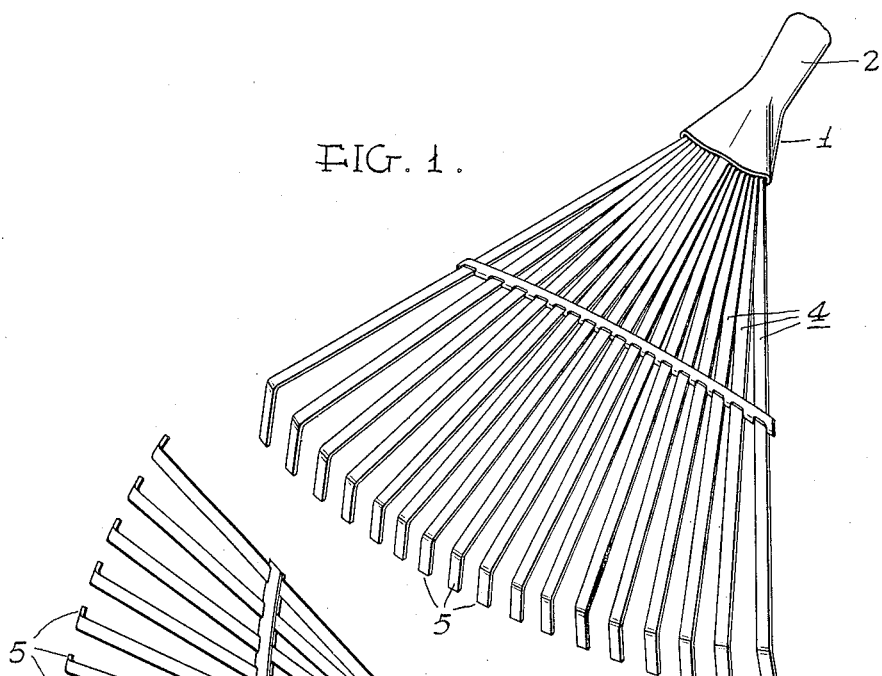
Fig. 1 is a view in perspective of the working head of a rake made in accordance with the invention.
Figure 2:
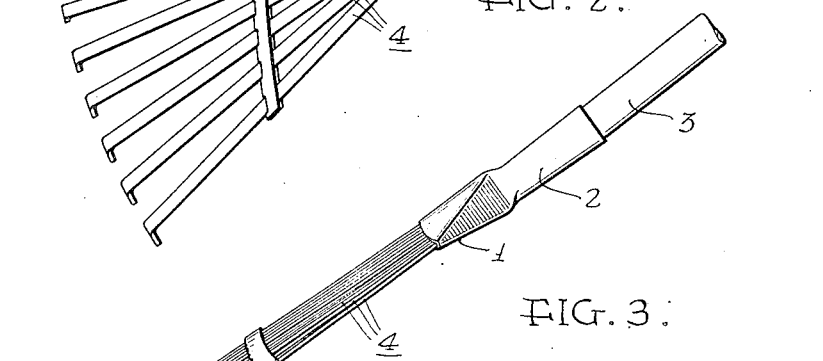
Fig. 2 is a top view of the rake showing a portion of the handle element.
Figure 3:
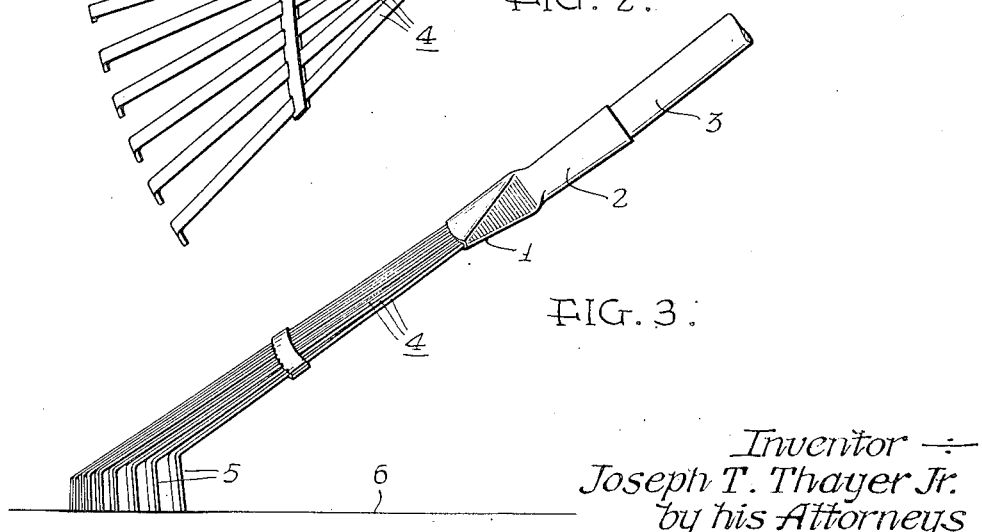
Fig. 3 is a side elevational view of the rake in a normal working position with respect to an underlying work surface.

With reference to the drawings, the rake head illustrated in Fig. 1 as an embodiment of the invention comprises a member 1 which combines a ferrule 2, for reception of the conventional handle element 3, see Figs. 2 and 3, and a support for a plurality of tines 4 from which the said tines emanate divergently to form a fan-like assembly of curved outer end contour. The outer terminal portions 5 of the tines are offset downwardly from the plane of the assembly so that when the rake is presented to the ground or other work surface the said offset portions will be approximately perpendicular to the said surface, as illustrated in Fig. 3, wherein the work surface is indicated by the line 6.

If the offset portions 5 were made of equal length, in accordance with the conventional practice, it is evident that with the rake addressed to the work surface at the aforesaid normal working angle, the curve described by the working tips of the tines would in effect assume a relation of tangency with the said surface, and such state of tangency would necessarily result in only a limited number of the tines at the center of the assembly coming into contact with the work surface.

In accordance with the present invention, the offset ends of the tines are graduated as to length, see Figs. 1 and 3, so that when the rake is in the normal working position, see Fig. 3, the tip ends of the tines will lie in the common plane of the work surface. Thus, the offset portions 5 of the center tines of the assembly are relatively short, with the extremities of the other tines increasing in length progressively toward each end. The different lengths of the offet portions 5 affording uniform contact with the work surface for any given inclination of the rake may readily be determined by obvious methods. By this device, a condition of maximum rake efficiency is obtained.

It will be apparent that the rake illustrated in the drawings is subject to considerable modification in structural detail without departure from the invention as defined in the appended claims.

I claim:

1. A lawn rake comprising a plurality of tines assembled in side-by-side relatively spaced relation and approximately in a common plane, means uniting the tines at one end of said assembly, the other ends of the tines describing a curve in the said common plane and having their terminal portions offset from said plane so that when the assembly is held at a normal working angle with respect to a work surface the extremities of the offset portions will occupy a relatively upright position to the plane of said surface, and said offset portions differing as to length so that the tips thereof will lie approximately in a common plane corresponding to the plane of the work surface when the assembly is held at the said normal working angle.

2. A lawn rake according to claim 1 wherein the tines diverge toward the free ends thereof to form a fan-like assembly.

3. A lawn rake according to claim 1 wherein the tines are resiliently movable in planes intersecting the said common plane.

JOSEPH T. THAYER, Jr.

REFERENCES CITED

The following references are of record in the file of this patent:

UNITED STATES PATENTS

| Number | Name | Date |
|---|---|---|
| 1,210,175 | Kimber | Dec. 26, 1916 |
| 1,499,086 | Tsuchiya | June 24, 1924 |
| 1,916,052 | Jenkins | June 27, 1933 |